US007656272B2

(12) United States Patent
Baucom

(10) Patent No.: US 7,656,272 B2
(45) Date of Patent: Feb. 2, 2010

(54) GAMING SECURITY SYSTEM AND ASSOCIATED METHODS FOR SELECTIVELY GRANTING ACCESS

(75) Inventor: L. Stephen Baucom, Mint Hill, NC (US)

(73) Assignee: Marcon International, Inc., Harrisburg, NC (US)

( * ) Notice: Subject to any disclaimer, the term of this patent is extended or adjusted under 35 U.S.C. 154(b) by 719 days.

(21) Appl. No.: 11/511,009

(22) Filed: Aug. 28, 2006

(65) Prior Publication Data

US 2007/0046423 A1 Mar. 1, 2007

Related U.S. Application Data

(60) Provisional application No. 60/712,178, filed on Aug. 28, 2005.

(51) Int. Cl.

| | |
|---|---|
| ***G06F 7/04*** | (2006.01) |
| ***G06K 19/00*** | (2006.01) |
| ***B60R 25/00*** | (2006.01) |
| ***A63F 9/00*** | (2006.01) |
| ***A63F 9/24*** | (2006.01) |

(52) U.S. Cl. .................... 340/5.82; 340/5.52; 340/5.73; 273/309; 463/29

(58) Field of Classification Search ................ 340/5.52, 340/5.82, 5.73; 273/236, 309; 463/29
See application file for complete search history.

(56) References Cited

U.S. PATENT DOCUMENTS 6,882,269 B2 * 4/2005 Moreno ..................... 340/5.73
6,975,202 B1 * 12/2005 Rodriguez et al. ......... 340/5.25
7,198,571 B2 * 4/2007 LeMay et al. ................. 463/25
2003/0084691 A1 * 5/2003 Kato et al. ................. 70/278.3
2005/0077995 A1 * 4/2005 Paulsen et al. ............... 340/5.6

* cited by examiner

*Primary Examiner*—Daniel Wu
*Assistant Examiner*—Mark Rushing
(74) *Attorney, Agent, or Firm*—Clemens Bernard PLLC; Christopher L. Bernard

(57) ABSTRACT

In various embodiments, the present invention provides a keyless management system for automating selective access to a lockable device and a method for selectively granting access. The system and method include the lockable device coupled to and secured by a security assembly; a processor remotely located from the device executing one or more algorithms operable for identifying a user, authorizing a predetermined level of command control based upon the identity of the user, receiving a command from the user to provide access to the device to at least one of the users and a third party, and translating the command into a form that may be received by the security assembly; a communications channel operable for communicating the translated command to the security assembly; and a controller proximately located to the device executing one or more algorithms operable for actuating the security assembly in response to the translated command, thereby providing access to the device to at least one of the users and a third party.

11 Claims, 7 Drawing Sheets

GAMING SECURITY SYSTEM AND ASSOCIATED METHODS FOR SELECTIVELY GRANTING ACCESS

CROSS REFERENCE TO RELATED PATENT APPLICATION

The current application claims the benefit of the earlier priority filing date of the provisional application, Ser. No. 60/712,178, that was filed on Aug. 28, 2005.

FIELD OF THE INVENTION

The present invention relates generally to the gaming and security fields. More specifically, the present invention relates to a keyless management system for the gaming industry for automating selective access to a lockable device, and associated methods for selectively granting access to the lockable device, such as dealer access to a tray of chips at a table, technician access to the interior of a slot machine, and the like.

BACKGROUND OF THE INVENTION

Security is of paramount importance in the gaming field. Casinos must continually control access to and account for large sums of money, in the form of cash, chips, and the like. This task is made difficult by the number of people who must necessarily have access to and handle the money, including back room personnel, transportation personnel, dealers, and the like. It is a common practice in the gaming field to utilize tables, such as blackjack tables, craps tables, roulette tables, and the like, that are each equipped with a tray for holding chips. This tray is typically covered by a lockable glass, plastic, or metal lid or the like. The tray is fastened to the table, thereby securing the chips. A security lapse could potentially result in the loss of thousands of dollars or more. To deter theft, the personnel who are responsible for the movement of money (e.g. chips) generate reports detailing their actions and the actions of co-workers, therein providing a paper trail of who did what and when. The reports enable management to cross check the flow, access and people having responsibility for the chips. The more comprehensive the reports, the greater the deterrence. The cost in man-hours to generate the reports is a limiting factor, as the time cuts into the actual time available to perform the job of managing the tables. By way of example, a pit boss in a casino is responsible for the operation of multiple gambling tables, anywhere from 1 to 20 tables. If a table is closed the chips are typically locked in a chip tray with the lid locked. The chip tray is normally monitored by overhead cameras, whether the lid is on the tray or it is off. Most lids, while serving as a deterrent, are not designed to be impenetrable. When a dealer needs to gain access to the chips, he/she must request a manager (i.e. the pit boss or the like) to open up a table. The pit boss typically goes to a control room for a key to unlock and remove the chip tray lid. Before taking possession of the key the pit boss must sign out for the key. The pit boss is usually escorted by a guard and a second security person or another manager when taking the key to the table. The dealer will be present so that once access to the chips is gained he/she can start the game, and the dealer also wants to view the contents of the chip tray when it is opened to know the value of chips in the tray. Typically, the pit boss then returns the key to the key control room, where it is signed back in. Again, the pit boss is accompanied by one or more security personnel to ensure the safe return of the key. Typically, the key is unique or one of a very few, and if the key is missing the casino security protocol assumes that the key has been duplicated, and dictates that all of the tray locks must be changed. Replacing the locks is expensive, in part because of the cost of the lock, and in part because of the potential disruption to business. All chip trays accessible by the key are vulnerable, and the mindset of a casino is that if one key has been stolen, then the locks on all the chip trays should be changed.

What is needed is a gaming electronic security system that has comparable or greater security than the conventional manual key system, where the electronic security system automates the locking and unlocking of the lid covering the chip tray, so that under normal operating conditions manual keys are not used. Further what is needed is a system that monitors the status of the chip tray (i.e. whether the lid is in place and whether the lid is locked). Additionally desirable would be a system that selectively grants access, maintains a log of who initiates a request to access the chip tray, tracks when the chip tray lid was unlocked or locked, and monitors when the lid was removed or replaced. The system should also generate reports detailing the actions of the personnel who were present when the chip tray is locked or unlocked, and a historical record of the status of the chip tray over a specified period of time. In addition to maintaining comparable or greater security, the system should also retrofit existing chip trays and tables, and be substantially invisible to the players with no visible change in the layout of the gaming table. The system must be robust in that it is reliable and cost effective, and be compatible with a conventional manual key system, such that a chip tray can still be opened by a key. In the event that the changing the locks is necessary, then what is needed is a system that enables the new lock to be quickly converted to the electronic security system, such that there is minimal interruption of gaming. Ideally, the conversion would take place even when the table is in use.

SUMMARY OF THE INVENTION

In various exemplary embodiments, the present invention provides an electronic security system and associated methods for selectively granting keyless access to a lockable device, for instance to a tray of chips attached to a gaming table, a slot machine, or the like; tracking when and to whom access is granted; automating access; monitoring the status of the lockable device and issuing alerts when the lockable device is not secured; establishing levels of security profiles for the lockable device, and generating reports that recap the history of access and security status of the lockable device.

The invented keyless management system for automating selective access to a lockable device is comprised of a command kiosk providing a means to remotely manage multiple lockable devices and a security assembly that is the remote device, where the remote device is proximate to the lockable device and provides a means to lock or unlock the lockable device. The command kiosk comprises a touch screen personal computer having a processor executing one or more algorithms operable for identifying a user, authorizing a predetermined level of command control based upon the identity of the user, receiving a command from the user to provide access to the lockable device to the user and a third party, generating and translating the command into a form that may be received by a remote device, where there is at least one remote device; a radio frequency transceiver; a biometric scanner for logging the user on to the computer; a keyless management system software application with a database program, wherein the application provides a listing and a current status of each lockable device controlled by the command kiosk; and a communications channel operable for communicating the translated command to the remote device. The security assembly comprises a controller having a unique address, that has one or more algorithms for translating the communicated command and implementing the translated command; an actuation mechanism actuated by the translated command; one or more switches for detecting if the status of the actuation mechanism is positively locked or positively unlocked or if the status is in an alert condition or otherwise; a reporting algorithms for translating the status into a form that may be received by the command kiosk; a radio frequency transceiver; a housing for mounting and protecting the security assembly; and a communications channel operable for communicating the translated status to the command kiosk. Typically, the actuation mechanism comprises a solenoid that actuates a latch bar, and the lockable device is a chip tray with a lockable lid disposed over a top of the tray, where said tray is recessed within a surface of a table.

The one or more switches for detecting if the status of the actuation mechanism are preferably a first micro limit switch that is actuated when the latch bar is actuated. A second micro limit switch is depressed when the lockable lid is correctly positioned over the top of the tray. When the first micro limit switch is actuated and the second micro limit switch is actuated, the status of the chip tray is locked. When the first micro limit switch is not actuated and the second micro limit switch is not actuated and the lid is removed, the status of the chip tray is unlocked. When the first micro limit switch is actuated and the second micro limit switch is not actuated, the status of the chip tray is in an alert condition. When the first micro limit switch is not actuated and the second micro limit switch is actuated, the status of the chip tray is in an alert condition as the lid is on but not locked. The application provides the touch screen with color coded icons indicating the status of whether the chip tray is locked, unlocked or in the alert condition.

The communications channel of the command kiosk and the communications channel of the security assembly communicate over an encrypted channel, such as a 56 bit dez encryption using frequency hopping spread spectrum radio frequency operating at 900 MHz.

The algorithm authorizing the predetermined level of command control based upon the identity of the user utilizes at least three levels of access, user level, administrator level and technician level; and the lockable devices have levels of access, wherein the authorizing algorithm only permits an individual who has successfully logged in to change the status of the lockable device, from locked to unlocked or vice versa, and the individual must have as high or higher level of access than the lockable device's access level.

Furthermore the invention is a method for selectively granting access. The method is comprised of the steps of providing a lockable device coupled to and secured by a security assembly; providing a command kiosk with a processor remotely located from the lockable device executing one or more algorithms operable for identifying a user, authorizing a predetermined level of command control based upon the identity of the user, receiving a command from the user to provide access to the device to at least one of the user and a third party, and translating the command into a form that may be received by the security assembly; providing a communications channel operable for communicating the translated command to the security assembly; providing a controller proximately located to the lockable device executing one or more algorithms operable for actuating the security assembly in response to the translated command, thereby providing access to the lockable device to at least one of the user and a third party; logging in a user with a biometric scanner and confirming against a database of users, where each user has a biometric password and is assigned a level of access; selecting a lockable device and confirming against a database of lockable devices having a unique address and a level of access, that the user has as high or a higher level of access than the selected lockable device; assuming that the user has clearance, selecting at least one third party from a list; actuating a lock on a selected lockable device, or canceling to exit or start the process over; and recording all entries for possible later generation of a report.

Note that the method is particularly suitable as a gaming method for selectively granting access. As such the lockable device is selected from the group consisting of a tray disposed within a surface of a table, an apparatus disposed within a slot machine, and the like. In the case of a tray, there is a lid disposed over a top of the tray coupled with a selectively actuated latch assembly, and in the case of a slot machine there is a door disposed over an opening of the slot machine coupled with the selectively actuated latch assembly. The processor is further operable for receiving a command from the user to prevent access to the device for at least one of the users and a third party and translating the command into a form that may be received by the security assembly. After actuating the actuating a lock, the user is automatically logged out. Alternatively, the security assembly is only actuated temporarily, reverting to an initial state after a predetermined period of time.

OBJECTS OF THE INVENTION

The principal object of the invention is to provide a keyless management system for automating selective access to a lockable device, such as a chip tray having a locking lid on a gaming table.

A further object is to provide a system that is compatible with a keyed system, wherein the system can be retrofitted to existing keyed lockable devices.

Another object is to provide a means to substantially reduce the amount of paper reports generated by the personnel who lock and unlock the lockable devices.

A further object is to provide a system wherein even with the automation, there is no reduction in security.

Another object is to provide a means for locking and unlocking chip trays with a locking lid.

An additional object is to provide a means of monitoring the status of the chip trays with a locking lid, whether the lid is on and locked, off and unlocked, or in an alert status, such as if the lid has been tampered with or was not properly locked or unlocked.

BRIEF DESCRIPTION OF THE DRAWINGS

The present invention is illustrated and described herein with reference to various figures, in which like reference numbers denote like components and/or parts, and in which.

DETAILED DESCRIPTION OF THE INVENTION

Figure 2:
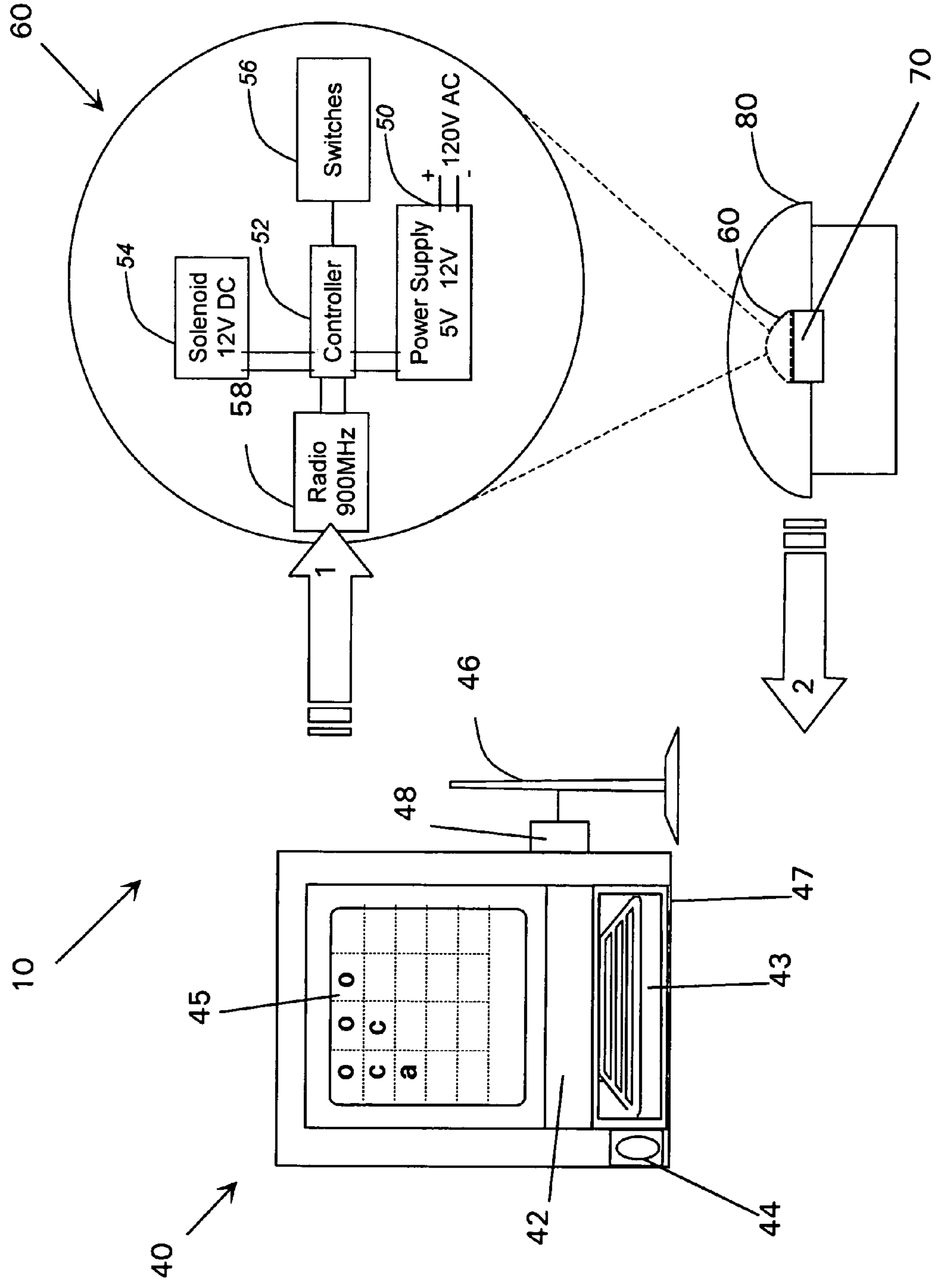
FIG. 2 is a schematic diagram illustrating one exemplary embodiment of the keyless management gaming security system for selectively granting access, such as dealer access to a tray of chips 70 at a table 80, technician access to the interior of a slot machine, or the like, of the present invention.
Figure 3:
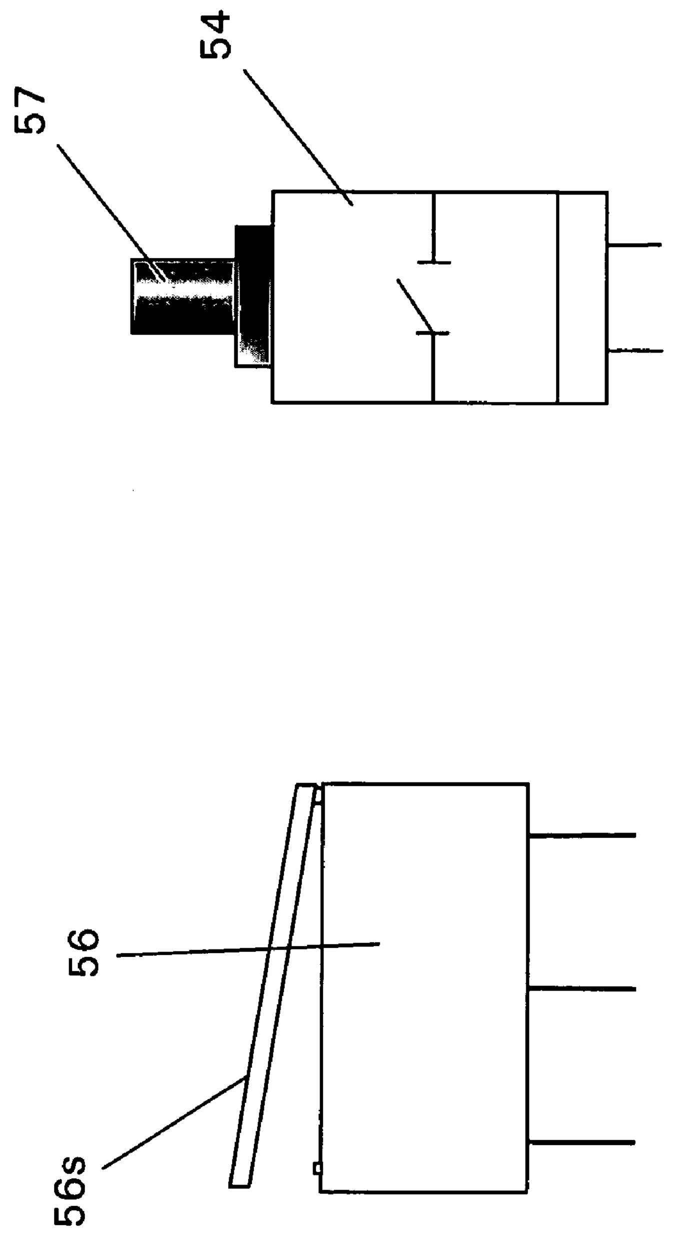
FIG. 3 is a schematic diagram illustrating one exemplary embodiment of a number of limit switches associated with and utilized in the gaming security system of FIG. 2.
Figure 5:
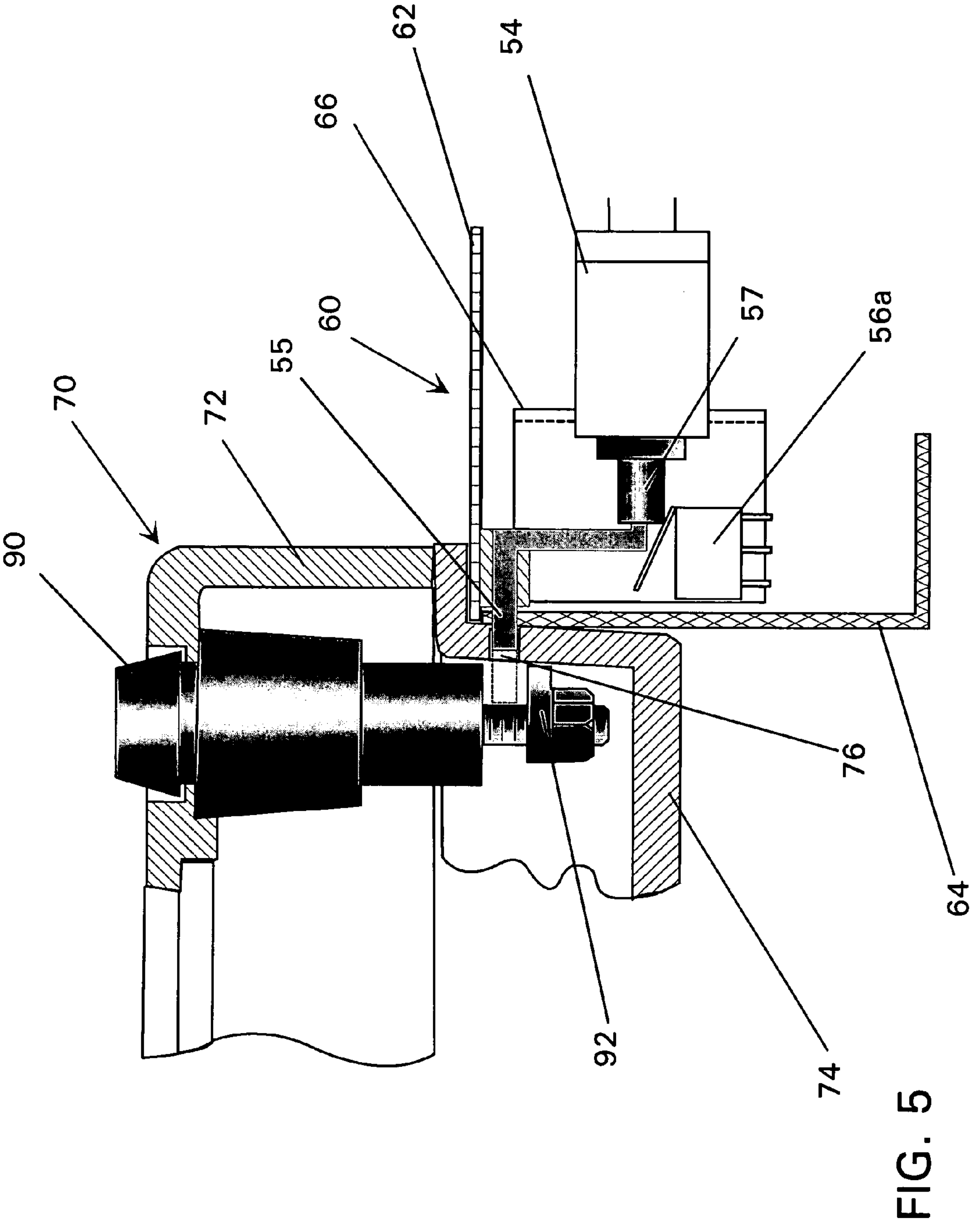
FIG. 5 is a cross-sectional partial view illustrating one exemplary embodiment of the overall latch assembly configuration associated with and utilized in the gaming security system of FIG. 2.

In one exemplary embodiment of the present invention, the system is a keyless management system 10 for automating keyless access to a chip tray having a lid with a conventional keyed lock. As illustrated in FIG. 2, the chip tray 70 is fastened to a gaming table 80, and the lid is traditionally removed when it is unlocked when the table is opened. In the exemplary embodiment the system can be fitted to a new key locked chip tray or retrofitted to an existing key locked chip tray. Installation occurs during a table recovering. The system 10 is comprised of a processor 42 located in a command kiosk 40 for managing access to tables located in the vicinity, and enables an authorized user to lock or unlock the chip tray using the command kiosk 40. The processor 42 sends commands via radio transceiver 48 with an antenna 46 over a secure communication channel 1, such as a 900 MHz, encrypted FHSS (frequency hopping spread spectrum), to a security assembly 60 located within the gaming table 60. The security assembly 60 actuates keyless unlocking and locking of the chip tray, and also allows keyed locking and unlocking of the chip tray lid. Typically, the kiosk controls up to 20 tables. The processor 42 has a touch screen 45 housed in a cabinet with a lockable drawer 47 containing a keyboard 43, the radio frequency transceiver 48 and attached antenna 46, a biometric scanner 44 for logging on to the computer 42, a keyless management system software application with a database program, an algorithm that provides secure commands to be issued to a designated security assembly 60 having a unique MAC (media access control) address and a de-encryption algorithm for deciphering information received from the security assembly. The security assembly 60 electronically controls access to an associated chip tray 70 via a solenoid 54 that actuates a latch bar 55, as shown in FIG. 5. Actuation is effected by plunger 57. The solenoid is mounted on bracket 66 attached to the housing 69, or a wall therein. The solenoid and the latch bar comprise an actuated latch assembly. Typically, there is one security assembly 60 and one chip tray 60 per gaming table 80. In a preferred embodiment, the security assembly is recessed in the top of the table, mounted flush with the surface, and covered with felt. The security assembly 60 is not visible when installed, and can only be accessed by removing the felt. The security assembly is compactly sized so that it can easily fit into substantially all conventional gaming tables at a position proximate to the playing area on the table coupled to the chip tray. The chip tray is normally configured so that the lockable lid opens away from a dealer, adjacent to the playing area. FIG. 5 illustrates the security assembly 60 coupled to the chip tray 70. A unique feature of the invention arises from the fact that most conventional lockable chip tray lids 72 utilize a cam lock 90 that is actuated with a key (not shown), where the cam lock has a cam that is sufficiently long such that when the cam is rotated, a portion of the cam pivots into a slot 76 in the wall of the chip tray 74, therein engaging the cam with the tray. In the instant invention the original cam is replaced with a shortened, offset custom cam 92 which is too short to engage the slot. When the custom cam is engaged by the latch bar 55, it is locked. In the locked position the latch bar projects through the slot overlapping the custom cam, as illustrated by dashed lines. This feature enables the cam lock 90 to be locked and unlocked with a key when the latch bar 55 is in the locked position. In the instant invention the custom cam 92 serves as the engaged element rather than its traditional role as the engaging element. As shown in FIG. 2, the security assembly is also comprised of sensors, typically micro limit switches, which detect the position of the latch bar (locked or unlocked), and the lid (whether it is on or off). As can be seen in FIG. 2, the security assembly 60 has a controller 52 with a transceiver 58 to receive the encrypted commands 1 issued by the processor 42, an algorithm to de-encrypt the commands, and a digital to analog interface to actuate the solenoid 54. The controller regularly transmits encrypted status information 2 to the command kiosk 40. The status information includes a time stamp, the position of the latch bar (locked or unlocked) and the lid (on or off) as determined by the sensors (i.e. limit switches 56). Status updates are typically sent 10 times a second or more frequently. The information is encrypted with an encryption algorithm compatible with the processor's de-encryption algorithm.

The keyless management system software application provides a method for remotely managing the chip tray and the like, a means of selectively granting access, a means of maintaining a log of who initiates a request to access the chip tray, a means of monitoring if the chip tray lid is unlocked or locked and if the lid is removed or replaced or otherwise tampered with. The application logs the activity in a database for reports detailing the actions of the personnel who were present when a chip tray is locked or unlocked, creates a historical record of the status of the chip tray over a specified period of time, and authorizes a predetermined level of command control based upon the identity of the user, maintains a profile of the tables where each table has a name, a MAC address, and a security level for access to the table; and a profile of the users, where each user has a personal security level for access and a means of verifying their identity such as a personal password, a written signature, a biometric signature such as a finger print scan, a retinal scan, and the like. The user can only access tables where the user has a higher level of security clearance than the security level for access for the table. There are optimally three types of users, a manager such as a pit boss, an administrator and a technician. The access level is substantially determined by the need to perform their job. A manager who is running the tables need not necessarily have security clearance to add or delete tables, or add or delete personnel, or change the security level for personal. An administrator on the other hand would need this level of access, and would have a higher level of security. A technician working on the processor would need to have access to files and scripts and would usually require the highest level of security, possibly at periodic intervals.

Figure 4:
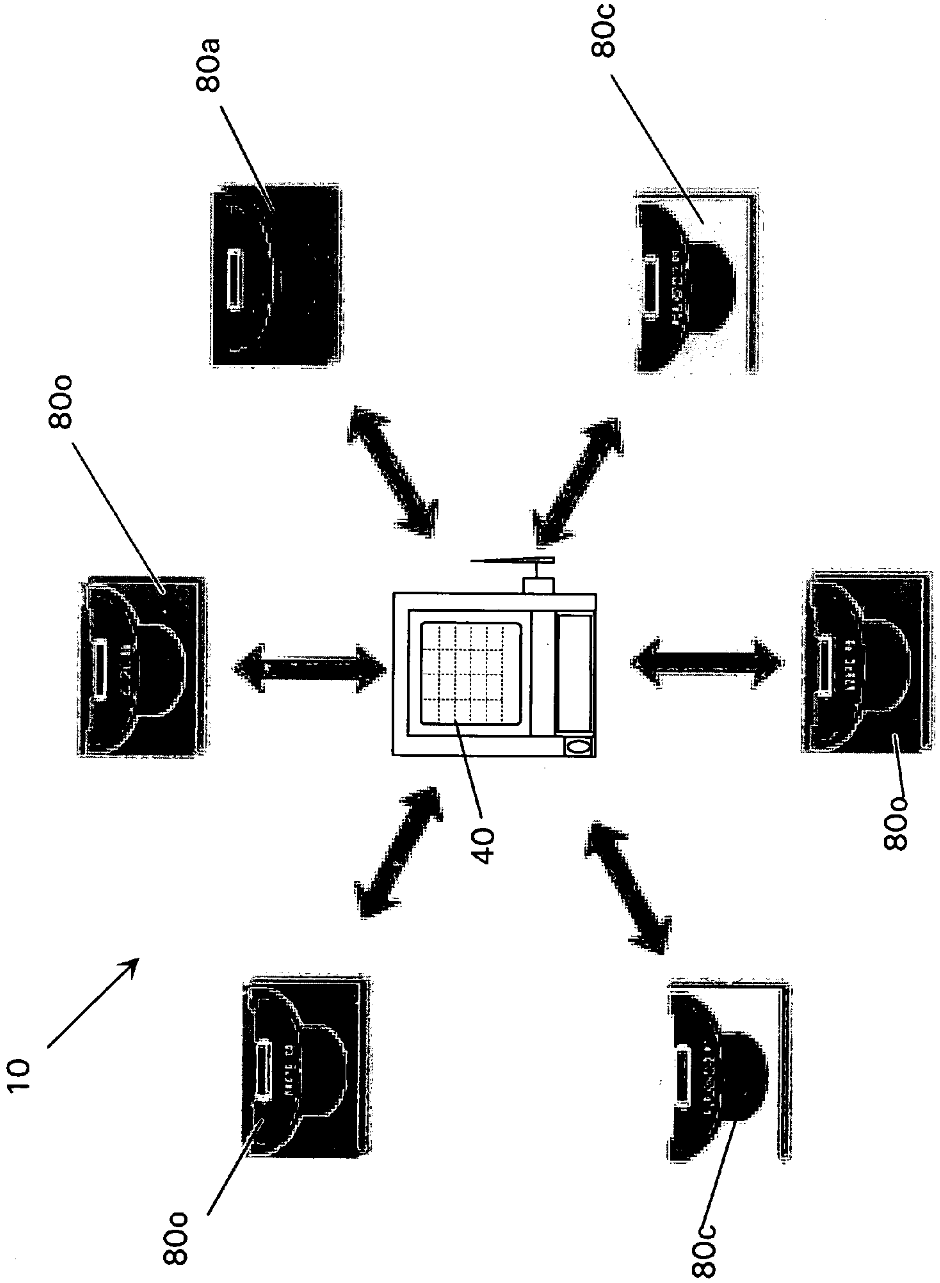
FIG. 4 is a schematic diagram illustrating the command kiosk controlling six gaming tables.
Figure 6B:
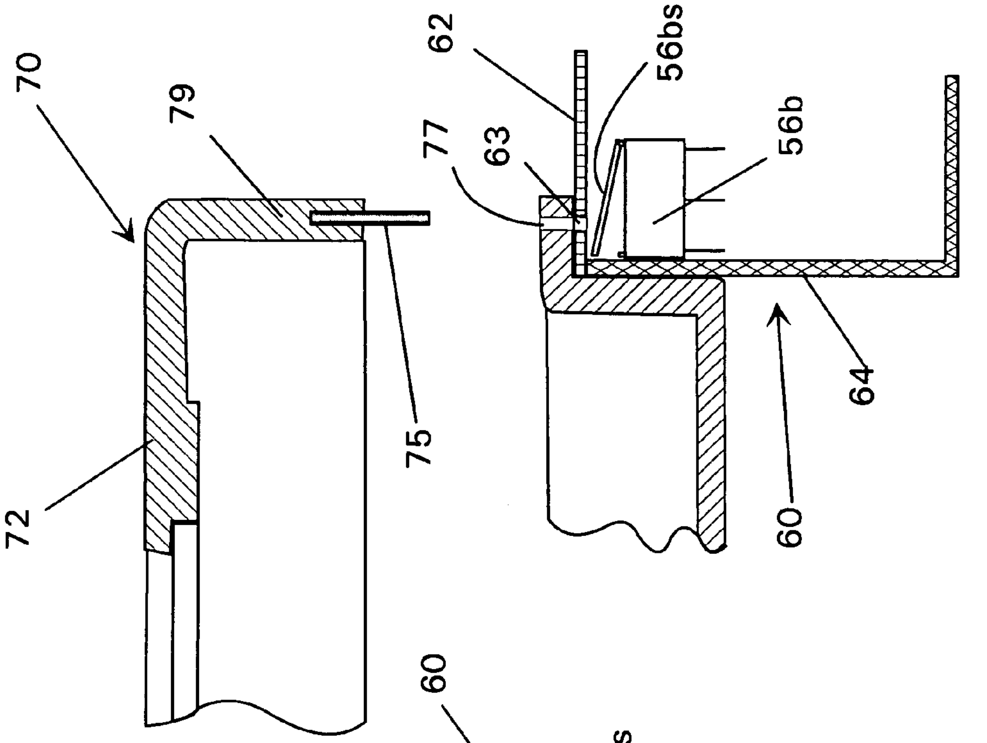
FIGS. 6*a*-6*b* are cross-sectional partial views illustrating one exemplary embodiment of the chip tray lid limit switch assembly for sensing if the lid is properly positioned on the chip tray.
Figure 6A:
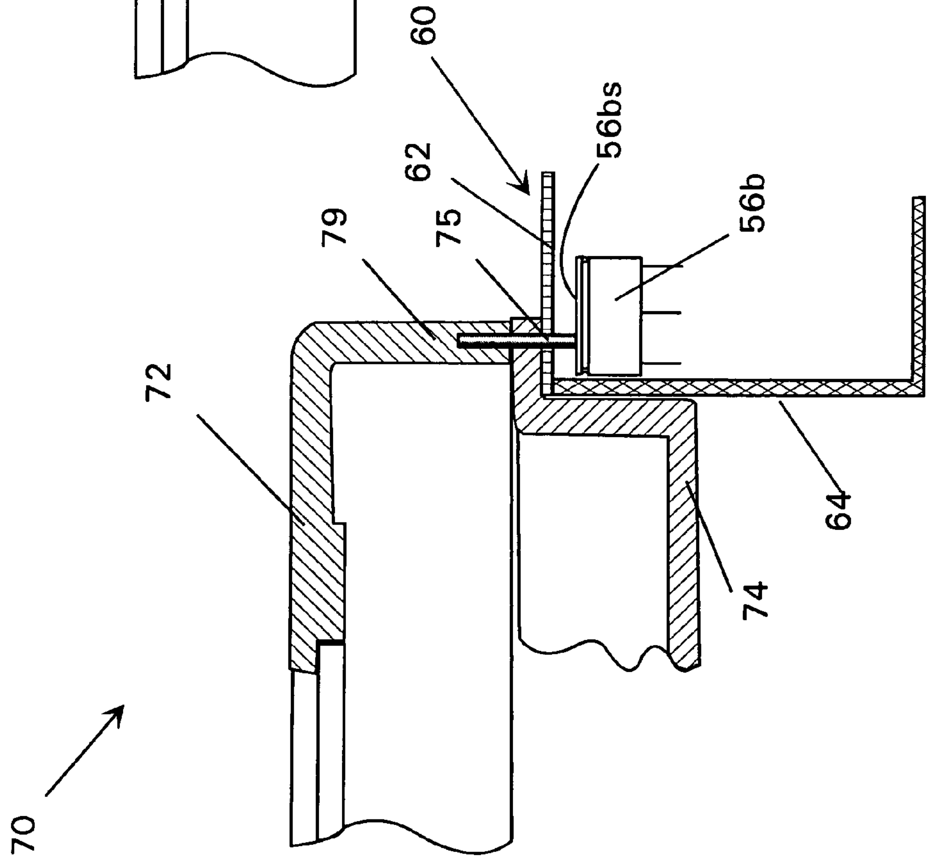
Figure 7:
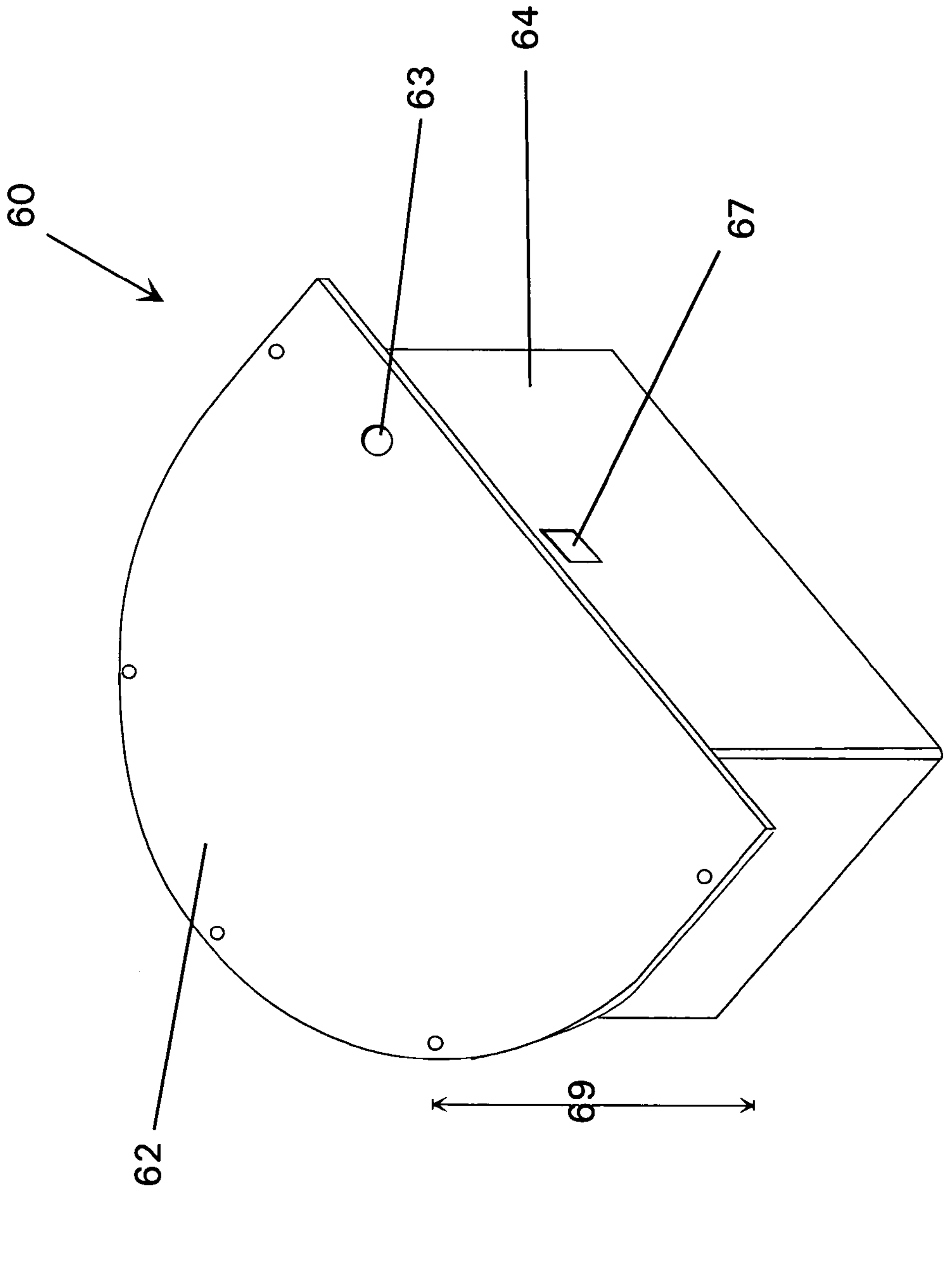
FIG. 7 is a perspective view illustrating the housing of the security assembly of the table associated with and utilized in the gaming security system of FIG. 2.

Referring to FIG. 4 the command kiosk 40 of the keyless management system 10 displays a touch screen with a matrix of icons, diagrammatically represented by dashed cross-hatching, that simulate the tables 80. The touch screen provides an easy to read visible representation of each of the tables. The icons are color coded to indicate their status. For instance, a gaming table that has a closed chip tray is yellow 80*c*, a table that is open is green 80*o*, and a table where there is a security issue is red 80*a*. The touch screen 45 as illustrated in FIG. 2, has letters "o", "c" and "a" combined with the number 80, where the letters respectfully designated whether the tables are open, closed, or have a security issue and are on status alert. Examples of security issues include when the lid 72 is on but not locked, and when the lid 72 is off but the latch bar 55 is in the lock position. FIGS. 5 and 6 illustrate how the status of the chip tray is determined. Referring to FIG. 5, when the chip tray is unlocked, the limit switch 56*a* is "open", and when it is locked the plunger 57 changes the limit switch 56*a* to the "closed" position. The latch bar 55, which emerges from the wall 64 through opening 67 of the housing 69 as shown in FIG. 7, is pushed through the slot 76 of the chip tray 74, and engages the custom cam of the cam lock 90 which is in the chip tray lid 72. Furthermore, as shown in FIGS. 6*a* and 6*b*, when the lid 72 is fitted on the tray 74, has a pin 75 which projects from the sidewall 79 of the lid 72. When properly positioned the pin penetrates an opening 77 in the flanged top of the tray, and projects through access hole 63 in the top 62 of the housing 69 of the security assembly 60. The pin 74 presses down on the limit switch sensor 56*bs*, such that the switch sensor 56*b* is "closed". If the pin 75 is not depressing the sensor then the lid 72 is either not on or is improperly aligned, and the latch bar 55 can not engage the custom cam 92, and the lid is "open". This would constitute an alert status and the touch screen would reflect this by the color of the icon, or as shown in FIG. 2 the letter "a". An alarm can also issue, or any other variety of signals. Any change in the status of the switches not initiated by the command kiosk, for instance by tampering, is quickly detected, as the controller sends back the status updates multiple times per second.

In one embodiment, after logging in, by touching the icon on the screen a user or administrator or technician can initiate a request to change the status of the table. For instance, if a pit boss wants to open a table, he/she would login, using the biometric finger print scanner that converts the scan to a digital numeric representation and compares the digital numeric representation to one that is on file in the database confirming that the user is an authorized user. When the user selects a table, the processor confirms that the user is has security clearance to access to the table. Assuming that the user has clearance, the application brings up a window of responsible parties from three lists. Responsible parties are for example administrators, dealers and security. The user selects an individual from each of the three lists, and then touches "open" to unlatch the lid, or "cancel" to exit or start the process over. Typically, after the table is opened or closed the user is automatically logged out. Log out can also be set to automatic after a certain period of time. All the information is collected in a database. The database can be configured with roles, such as user, administrator or technician. The different roles have default security clearance levels, but with proper authority the roles, and individual users can be granted higher or lower levels of security, or can have triggers that initiate other sequences when a user logs on. For example, a user could be ear marked to be monitored by additional cameras when the user logs on. An administrator can add or delete tables or users at the kiosk. Again using the touch screen, the administrator can bring up a menu to add the user, assign a level of security, and then scan in the biometric password. Similarly, when a table is added it is assigned a name, a MAC address, and a security level. The technician role typically has authority to do all.

Figure 1:
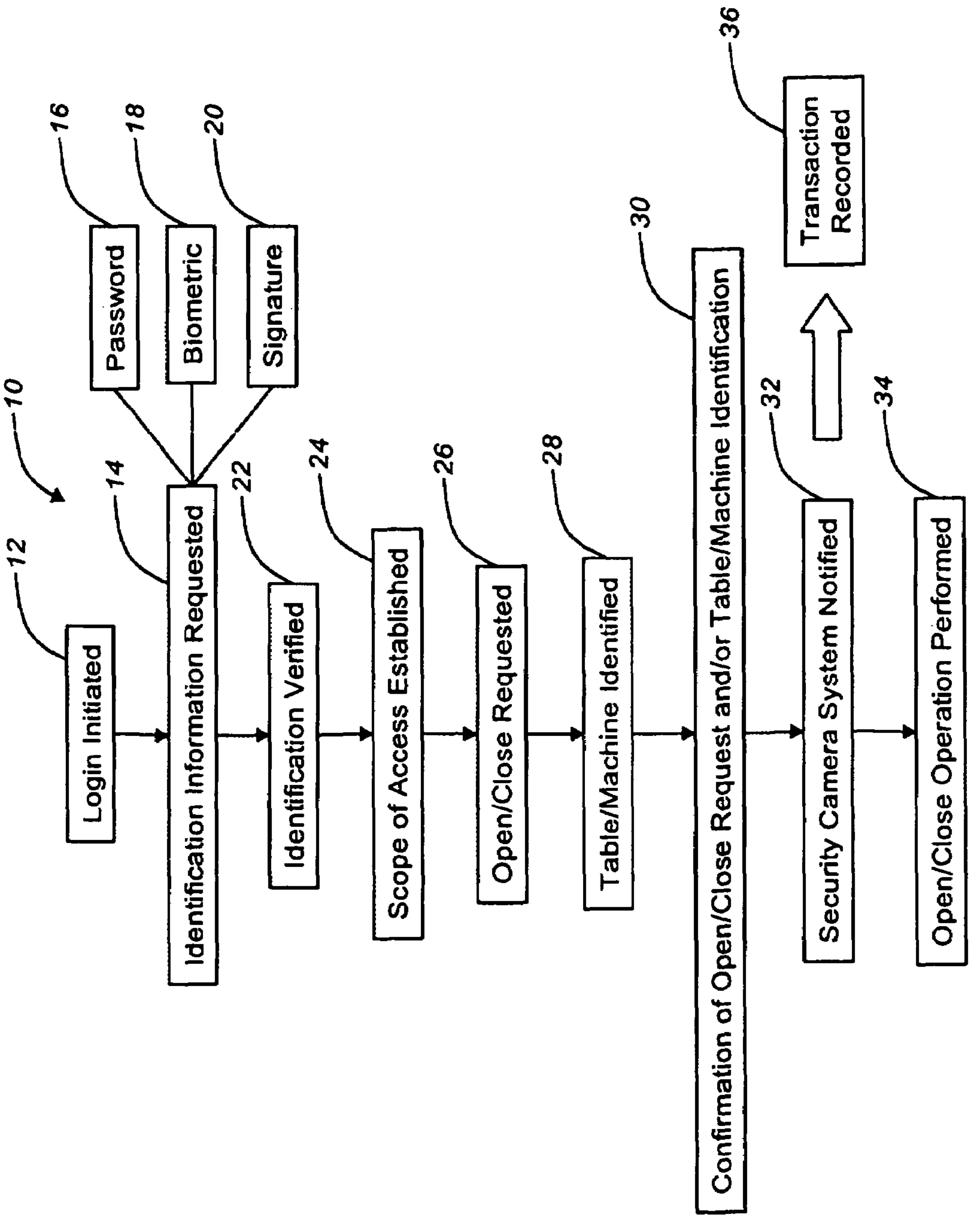
FIG. 1 is a flowchart illustrating one exemplary embodiment of the method for selectively granting access, such as dealer access to a tray of chips at a table, technician access to the interior of a slot machine, or the like, of the present invention.

Referring to FIG. 1, which is a flowchart illustrating an embodiment of the method for selectively granting access, such as dealer access to a tray of chips at a table, technician access to the interior of a slot machine, or the like, of the present invention. The invention 10 is a method for selectively granting access, such as dealer access to a tray of chips at a table, technician access to the interior of a slot machine, or the like, providing a keypad and display, touch screen, or the like suitable for displaying a number of menus, screens, and the like to a user, including a login screen. For purposes of this exemplary embodiment, the user is a manager (i.e. a pit boss or the like). The user initiates the login by pressing a button, making a selection, or the like (Block 12) and the system requests identification information from the user (Block 14). This identification information includes, for example, a user identification number/password 16, biometric information 18 (such as a fingerprint, retinal, or voice scan), and/or a signature 20 (entered via an electronic signature pad or the like). Using the identification information, the user's identification is verified (Block 22) and the permitted scope of the user's access (authorization level) is established (Block 24).

Once the user identification/authorization process is complete, the user makes a task request, such as an open/close request (Block 26). Following this task request, the user makes a table selection, for example, from a list of tables or a schematic diagram illustrating the location of the tables (Block 28). As will be readily apparent to one of ordinary skill in the art, slot machines, or any other items that one wishes to selectively open/close in a secure manner, whether related to the gaming field or not, may be substituted for the tables. Optionally, the tables that may be opened/closed/in an alert state at a given time are highlighted on the list or schematic diagram. Following the initial table selection, the system requests appropriate confirmation (Block 30). Upon confirmation, the system can communicate with the security camera system, allowing the security camera system to focus on and record a series of images of the table selected (Block 32). Finally, the open/close operation is performed (Block 34). Preferably, an audio and/or visual alarm is sounded/flashed during the open/close operation, which may be timed out after a given amount of time (such as 15 seconds, 1 minute, or the like). After the dealer lifts the lid off of the tray in order to open a table, or another comparable operation is performed, a "closed" switch reads "open" to the controller, the actuation mechanism which actually performs the open/close operation returns to a "relaxed" state, and a "locked" switch reads "closed" to the controller. Once the table is opened and the command kiosk receives a signal from the controller indicating that the switches meet the "open" requirements, the user may be logged out by the system. Preferably, data related to all of the above steps is acquired and stored in the database, including, for example, user identification information, date, time, action requested, table and the like (Block 36). When the command kiosk is not being used by a user, the touch screen illustrating the current status of the tables is displayed.

After the dealer puts the lid on the tray in order to close a table, or another comparable operation is performed, the "closed" switch reads "closed" to the controller, the actuation mechanism (i.e. the solenoid), which actually performs the open/close operation returns to a "relaxed" state, and the "locked" switch reads "closed" to the controller. Once the table is closed and the system receives a signal from the controller indicating that the switches meet the "closed" requirements, the user may be logged out by the system.

Preferably, a user that is logged in may complete only one transaction before being logged out in order to guarantee the user's identification and proper authorization. Additionally, the system as a whole may be equipped with a time out feature.

Once the user identification/authorization process is complete, the user selects which table to open/close by touching the corresponding icon on the touch screen. Following this task request, the user makes a table selection, for example, from a list of tables or a schematic diagram illustrating the location of the tables. Accordingly, the gaming security system 40 includes at least one table 44 containing circuitry and hardware operable for receiving an open/close command from the computer 42 and an antenna 46 via a radio frequency signal or the like. Again, as will be readily apparent to one of ordinary skill in the art, slot machines, or any other items that one wishes to selectively open/close in a secure manner, whether related to the gaming field or not, may be substituted for the tables. Optionally, the tables that may be opened/closed at a given time are highlighted on the list or schematic diagram. Following the initial table selection, the system 40 requests appropriate confirmation. Upon confirmation, the system 40 communicates with the security camera system, allowing the security camera system to focus on and record a series of images of the table selected. Finally, the open/close operation is performed. Preferably, an audio and/or visual alarm is sounded/flashed during the open/close operation, which may be timed out after a given amount of time (such as 15 seconds, 1 minute, or the like).

The circuitry and hardware of each of the at least one tables 44 include a power supply 50, which for safety reasons is converted to a low voltage. Once the table 80 is opened and the command kiosk 40 receives a signal 2 from the controller 52 indicating that the switches 56 meet the "open" requirements, the user may be logged out by the system 10. Preferably, data related to all of the above steps is acquired and stored, including, for example, user identification information, date, time, action requested, table, and the like. When the system 10 is not being used by a user, a schematic diagram illustrating the current status of the tables may be displayed.

In another exemplary embodiment of the present invention, a method for selectively granting access includes providing a device coupled to and secured by a security assembly; providing a processor remotely located from the device executing one or more algorithms operable for identifying a user, authorizing a predetermined level of command control based upon the identity of the user, receiving a command from the user to provide access to the device to at least one of the user and a third party, and translating the command into a form that may be received by the security assembly; providing a communications channel operable for communicating the translated command to the security assembly; and providing a controller proximately located to the device executing one or more algorithms operable for actuating the security assembly in response to the translated command, thereby providing access to the device to at least one of the user and a third party.

Advantageously, the systems and methods of the present invention provide for wireless asset control; multiple users may be provided with multiple degrees of asset access, errors are logged, and an audit trail of users and activities is created, it being possible to generate customizable reports.

Other potential applications of the systems and methods of the present invention include those associated with any/all keyed casino games; any/all keyed asset cabinets, boxes, drawers, etc.; any/all latched and/or keyed devices; and the like.

SUMMARY OF ACHIEVEMENTS OF OBJECTS OF THE INVENTION

The invention provides a keyless management system for automating selective access to a lockable device, such as a chip tray having a locking lid on a gaming table. Using the customized cam a conventional manual keyed system can be retrofitted to with the system, therein converting the manual system to an automated computerized system for controlling the lockable devices, which as illustrated include chip trays and the like. The keyless management system provides a means to substantially reduce the amount of paper reports generated by the personnel, as the system keeps a log of who, when and what lockable devices are locked, unlocked and routinely monitors the status security status of the lockable devices. Overall, even with the automation, there is no reduction in security. The keyless management system is particularly suitable for providing a means for locking and unlocking chip trays and the like, and by extension the gaming tables that they are affixed to. Furthermore, the invention provides a method that prescribes who has access to the system and lockable devices controlled by the system, and can sound an alarm when there is an attempt to breach the system.

Although the present invention has been illustrated and described with reference to preferred embodiments and examples thereof, it will be readily apparent to those of ordinary skill in the art that other embodiments and examples may perform similar functions and/or achieve similar results. All such equivalent embodiments and examples are within the spirit and scope of the present invention and are intended to be covered by the following claims.

What is claimed is:

1. A keyless management system for automating selective access to a lockable device, said system comprising:

a command kiosk providing a means to remotely manage a lockable device, wherein said command kiosk comprises:

a touch screen personal computer having a processor executing one or more algorithms operable for identifying a user, authorizing a predetermined level of command control based upon the identity of the user, receiving a command from the user to provide access to the lockable device to the user and a third party, generating and translating the command into a form that may be received by a remote device, where there is at least one remote device;

a radio frequency transceiver;

a biometric scanner for logging the user on to the computer;

a keyless management system software application with a database program, wherein the application provides a listing and a current status of each lockable device controlled by the command kiosk; and a communications channel operable for communicating the translated command to the remote device; and a security assembly that is the remote device, where the remote device is proximate to the lockable device and provides a means to lock or unlock the lockable device, where said security assembly comprises:

a controller having a unique address, that has one or more algorithms for translating the communicated command and implementing the translated command;

an actuation mechanism actuated by the translated command, wherein the actuation mechanism is a solenoid that actuates a latch bar;

one or more switches for detecting if the status of the actuation mechanism is positively locked or positively unlocked or if the status is in an alert condition or otherwise;

one or more reporting algorithms for translating the status into a form that may be received by the command kiosk;

a radio frequency transceiver;

a housing for mounting and protecting the security assembly; and a communications channel operable for communicating the translated status to the command kiosk;

wherein the lockable device is a tray with a lockable lid disposed over a top of the tray, wherein file tray has a slot that receives the cam and the locking lid has a keyed cam lock, wherein the cam comprises a custom cam that is shortened so that it is too short to engage the slot and it is offset below the slot such that when the latch bar is in the locked position, the latch bar projects through the slot and overlaps the custom cam.

2. The system of claim 1, wherein the one or more switches for detecting if the status of the actuation mechanism is comprised; a first micro limit switch that is actuated when the latch bar is actuated; and second micro limit switch that is depressed when the lockable lid is correctly positioned over the top of the tray.

3. The system of claim 2, wherein when the first micro limit switch is actuated and the second micro limit switch is actuated, the status of the tray is locked; when the first micro limit switch is not actuated and the second micro limit switch is not actuated and the lid is removed, the status of the tray is unlocked; when the first micro limit switch is actuated and the second micro limit switch is not actuated, the status of the tray is in an alert condition; when the first micro limit switch is not actuated and the second micro limit switch is actuated, the status of the tray is in an alert condition as the lid is on but not locked.

4. The system of claim 1, wherein the application provides the touch screen with color coded icons indicating the status of whether the tray is locked, unlocked or in the alert condition.

5. The system of claim 1, wherein the communications channel of the command kiosk and the communications channel of the security assembly communicate via 56 bit dez encryption using frequency hopping spread spectrum radio frequency operating at 900 MHz.

6. The system of claim 1, wherein the algorithm authorizing the predetermined level of command control based upon the identity of the user utilizes at least three levels of access, user level, administrator level and technician level; and the lockable devices have levels of access, wherein the authorizing algorithm only permits an individual who has successfully logged in to change the status of the lockable device, from locked to unlocked or vice versa, and the individual must have as high or higher level of access than the lockable device's access level.

7. The system of claim 1, wherein the command kiosk controls from 1 to 20 lockable devices, when the lockable device is a tray that is coupled to the security assembly and is mounted to a gaming table.

8. The system of claim 7, wherein the housing of security assembly has a flanged flat top, that provides that the entire security assembly when mounted is recessed within the gaming table, such that the top is flush with an upper surface of the gaming table, and when installed the security assembly is covered with a table felt or the like, and is not visible.

9. The system of claim 1, wherein the processor is further operable for receiving a command from the user to prevent access to the device for at least one of the user and a third party and translating the command into a form that may be received by the security assembly.

10. The system of claim 9, wherein the controller is further operable for activating the security assembly in response to the translated command, thereby preventing access to the device for at least one of the users and a third party.

11. The system of claim 1, wherein the security assembly is only actuated temporarily, reverting to an initial state after a predetermined period of time.

* * * * *